Aug. 1, 1961 E. GENNING 2,994,535

ARRANGEMENT OF SPOOLS IN A WIRE STOCK REPLACEMENT UNIT FOR MAGNETIC SOUND RECORDING AND REPRODUCING APPARATUS

Filed Sept. 8, 1954 2 Sheets-Sheet 1

INVENTOR:
ERNST GENNING
BY:
Michael S. Striker
agt.

Aug. 1, 1961 E. GENNING 2,994,535

ARRANGEMENT OF SPOOLS IN A WIRE STOCK REPLACEMENT UNIT FOR MAGNETIC SOUND RECORDING AND REPRODUCING APPARATUS

Filed Sept. 8, 1954 2 Sheets-Sheet 2

INVENTOR:
ERNST GENNING
BY:
Michael S. Striker
Agt.

United States Patent Office 2,994,535

Patented Aug. 1, 1961

2,994,535

ARRANGEMENT OF SPOOLS IN A WIRE STOCK REPLACEMENT UNIT FOR MAGNETIC SOUND RECORDING AND REPRODUCING APPARATUS

Ernst Genning, Fassberg, Celle, near Hannover, Germany, assignor to Protona Produktionsgesellschaft für elektro-akustische Geräte G.m.b.H., Hamburg, Germany Filed Sept. 8, 1954, Ser. No. 454,684

Claims priority, application Germany Sept. 8, 1953

4 Claims. (Cl. 274—4)

This invention relates to an arrangement of spools in a wire stock replacement unit for magnetic sound recording and reproducing apparatus, particularly of pocket-size, using wire as sound recording medium. The wire stock replacement unit contains a supply spool and a receiving spool between which the sound recording wire may go forth or back in a known manner. The spools are moved by a reversible drive of the magnetic sound recording and reproducing apparatus.

It is an object of the instant invention to permit by this replacement unit a speedy replacement of the spools with wire in a magnetic sound recording and reproducing apparatus, for example when the spools have been recorded to capacity or when a recording is to be dispatched at once. It is an object of the invention to avoid the necessity of imposing the spools individually on the drive of the apparatus and the trouble of having to introduce the thin sound recording wire into the magnetic recording head of the apparatus.

It is therefore another object of the invention to construct the replacement unit in such a way that it can be loaded with the spools just as a film-cassette, and that in loaded condition the recording wire is automatically introduced into the magnetic recording head when the cassette is placed on the platen of the drive of the magnetic sound recording and reproducing apparatus.

Another object of the invention is to construct the cassette in such a way that recorded cassettes can be reproduced or cancelled by the same apparatus. The cassette is, therefore, made for a magnetic sound apparatus for recording and reproducing.

Replacement-cassettes which in film apparatus have been known since many years are per se also known employed with magnetic sound recording and reproducing apparatus. However, such replacement-cassettes have so far been applicable to magnetic sound apparatus using sound tape. There are for example replacement-cassettes for sound recording tape of special steel or magnetizable plastics.

On the other hand, wire stock replacement units for apparatus with magnetically modulatable wire, particularly with very fine wire as used in pocket-size apparatus, have not become known to this day. As it is, it is not easy to introduce the recording wire into the magnetic recording head and to engage the spools with the drive of the apparatus for reliable operation. This task is the more difficult if pocket-size magnetic recording and reproducing apparatus are concerned operating with sound recording wire from about 0.04 mm. to 0.01 mm. thick. In that kind of apparatus it is very difficult to introduce the sound recording wire reliably and without damage thereto into the magnetic recording head. It often happens that the wire will slip from the recording head if during operation the apparatus would be turned upside down. Also, the thin recording wire is liable to break.

The arrangement according to the invention attains the above mentioned objects and removes the mentioned difficulties by the fact that the replacement unit is constructed to be a cassette containing the supply spool and the receiving spool and with means for automatic engagement with the drive and the magnetic recording head on the platen of the magnetic sound recording and reproducing apparatus from which it can be removed. To that end the wire extending between the spools is slideable parallelly to the plane of its extension by means of a resilient bow which, upon entering of the magnetic recording head into the cassette, urges the recording wire into the slot of the recording head keeping it therein. The resilient bow is attached to the bottom part of the cassette in such a way that it seizes over the recording wire urging it against the bottom of the cassette. In the interior of the cassette, under the resilient bow, an elastic bedding and guide pins for the wire are provided. The elastic bedding is of the same size as the area described by the resilient bow. This feature allows to disengage the recording wire elastically from the slot of the recording head and to block it against the elastic bedding provided on the cassette bottom automatically upon taking the cassette off the platen.

According to a further feature of the invention a leaf spring is provided in the interior of the cassette. If the cassette is taken off, the spring arms press against the top rim of the spools keeping them immovably in the cassette, thus preventing the spools' turning and unwinding the wire when the cassette is disengaged. When the cassette gets drivingly connected with the apparatus, the leaf spring will be lifted from the spools by pins provided on the platen and entering into the cassette through the bottom thereof, said pins adjusting the cassette in respect of the platen. Thereby the spools are unblocked and can be turned by the drive after connection with the drive has been established.

On its top side the cassette has a hand-operated locking means for fixing the cassette to the platen after coupling with the apparatus. As the case may be, the spool engagement and the locking means may also be operationally connected in such a way that by the moving of the locking means the spools get engaged or disengaged.

The cassette consists of two shells kept together by disengageable catch springs. Of the two shells the upper one carries the locking means with the leaf spring, and the lower one the spools with the holding pins thereof, the spring bow, an opening for the introduction of the magnetic recording head, and holes for the entering of the pins lifting the leaf spring off the spools. The upper shell of the cassette may be furnished with a note strip inserted into or put upon a groove or bulging respectively applied to the upper shell. That note strip may be used for writing the recording duration thereon to facilitate the refinding of the corresponding length of wire when the recording is preproduced. The note strip is expediently scaled in accordance with the length of time or of the recording wire.

The automatic coupling of the spools in the cassette with the drive axes of the platen may, in accordance with a further feature of the invention, also be solved by mechanical-magnetic means, in that for example each head of the axes of the drive to be coupled is furnished with a magnet whose flux of force through the cassette reel will establish a non-slip connection between the drive axes' heads with the spools. To that end each axis head of the drive may be made to be a sort of bowl-magnet with tapering walls of upwardly decreasing diameter and a central shod core magnet. The matching seating surface of the spool hub is made accordingly conically. Thereby, under the effect of the magnetic flux, the spool will automatically center around the axis head and draw close. For completing the magnetic flux from the bowl of the magnet to the central core a sheet metal disc is inserted into the upper rim of each spool in such a manner that when the spool is drivingly engaged on its drive axis head the soft-magnetic sheet metal disc will be positioned to leave a small gap between itself and the pole shoe of the magnetic core and to be in contact with the top rim of the bowl magnet. The field lines thus close from the magnetic core over the sheet metal disc in the topside of the spool to the bowl. In order to increase the density of field lines and therewith to improve the tight seating, the field lines should be bundled if possible. To that end, and according to another feature of the invention, tongs are cut into the sheet metal disc, preferably parallelly to the circumference of the magnetic core. These resilient tongs are attracted by the central magnetic core towards the pole shoe where they will densify the field lines.

The drawing shows in FIGS. 1 to 5 one embodiment of the invention. It will be understood that the inventive thoughts in their details may be given other embodiments without departing from the basic spirit of the invention.

In the drawing

Figure 1:
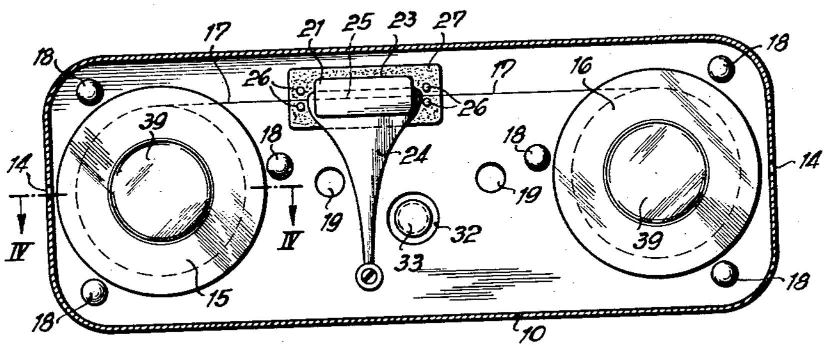
FIG. 1 is an inside view of the bottom shell of the cassette attached to the driven plate of the recording and reproducing apparatus.
Figure 2:
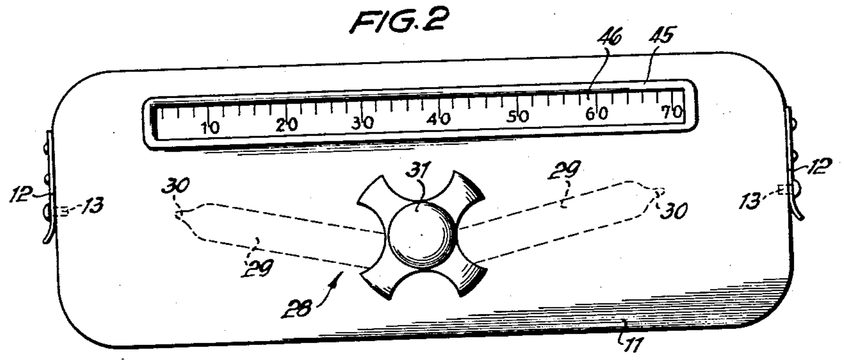
FIG. 2 is an outside view of the top shell of the cassette.
Figure 3:
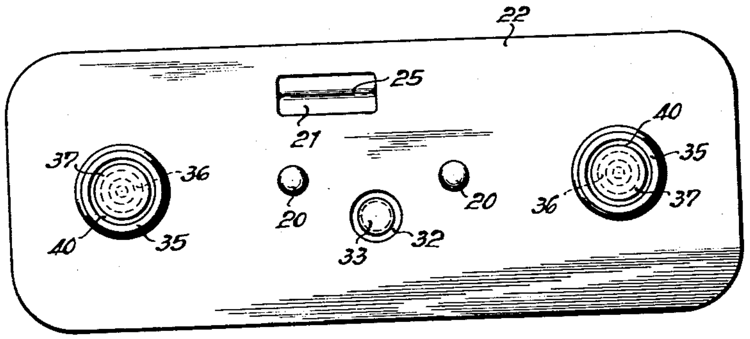
FIG. 3 is the drive platen of the magnetic recording and reproducing apparatus to be coupled with the cassette, showing the drive axes and the magnetic recording head.

The cassette consists of a bottom shell 10 and the top shell 11. On each side the top shell 11 carries a fixed spring leaf 12 with a pin 13. The pins 13 are positioned in the side wall of the top shell 11 and will snap into the holes 14 of the bottom shell 10 when the two shells are put together, locking the two shells 10 and 11 together. The lifting of the leaf springs 12 relieves the locking.

Located in the bottom shell 11 are the supply spool 15 and the receiving spool 16. Of course, 15 may also be the receiving spool and 16 the supply spool, as for example in the case when the recording wire is reversed. The spools 15 and 16 are positioned between holding and centering pins 18 unequivocally defining the position of the spools 15 and 16 in the cassette. The bottom shell 10 further has two gauged holes 19 for taking up the centering pins 20 provided on the platen 22. The magnetic recording head 21 of the magnetic sound recording and reproducing apparatus will slide through the aperture 23 when the cassette is placed on platen 22. Hereat the spring bow 24 will urge the recording wire 17 into the slot 25 of the recording head 21. At the same time the spring bow 24 also urges the recording wire 17 between the guide pins 26 which, when the cassette is removed from the platen 22, will counteract the lateral escaping of the recording wire 17 from the correct position in respect of the slot 25 of the recording head. When the cassette is drawn from the platen 22, the spring bow 24 acts downwardly urging the recording wire against the elastic bedding 27 provided in the bottom shell 10. Thereby the recording wire 17 is immobilized in the cassette between the guide pins 26. When the cassette is imposed upon the platen 22, the recording head 21 slides through the oblong hole 23 provided in the bottom shell 10, whereby the recording wire 17 under the pressure of spring bow 24 is introduced into the slot 25 of the recording head 21.

With the cassette taken off, the spools 15 and 16 must of course not turn in the cassette as otherwise the recording wire 17 will fall off the spools. To that end a leaf spring, designated as a whole by 28, is provided on the inner side of the top shell 11, said leaf spring 28 having two resilient arms 29 ending in noses 30. The resilient arms 29 fix the spools 15 and 16 by their top rims when the cassette is removed from the platen and may, as the case may be, slip into recesses (not illustrated) applied on the top rims of the spools with the spring noses 30. Thereby the spools are immobilized as soon as the cassette is taken off from the platen 22. When on the other hand the cassette is imposed upon platen 22 getting engaged with the drive and the recording head 21, the centering pins 20 provided on the platen 22 will enter into the cassette through the fitted holes 19 and urge the spring arms 29 upwardly towards the lid lifting them off the spool top rims and releasing the spools 15, 16 for rotation.

For connecting the cassette with the platen 22 the top shell 11 is provided with a locking screw 31 engaging upon the threaded pin 33 of platen 22 entering into the cassette through the opening 32.

According to another feature of the invention the locking screw 31 can also be operationally connected with the spool couplings between the feet of the supply spool 15 and the receiving spool 16 and the drive members to the effect that upon tightening of the locking screw 31 the spools 15, 16 are coupled with the drive, and disengaged from the drive upon loosening of the locking screw 31.

Figures 4, 5:
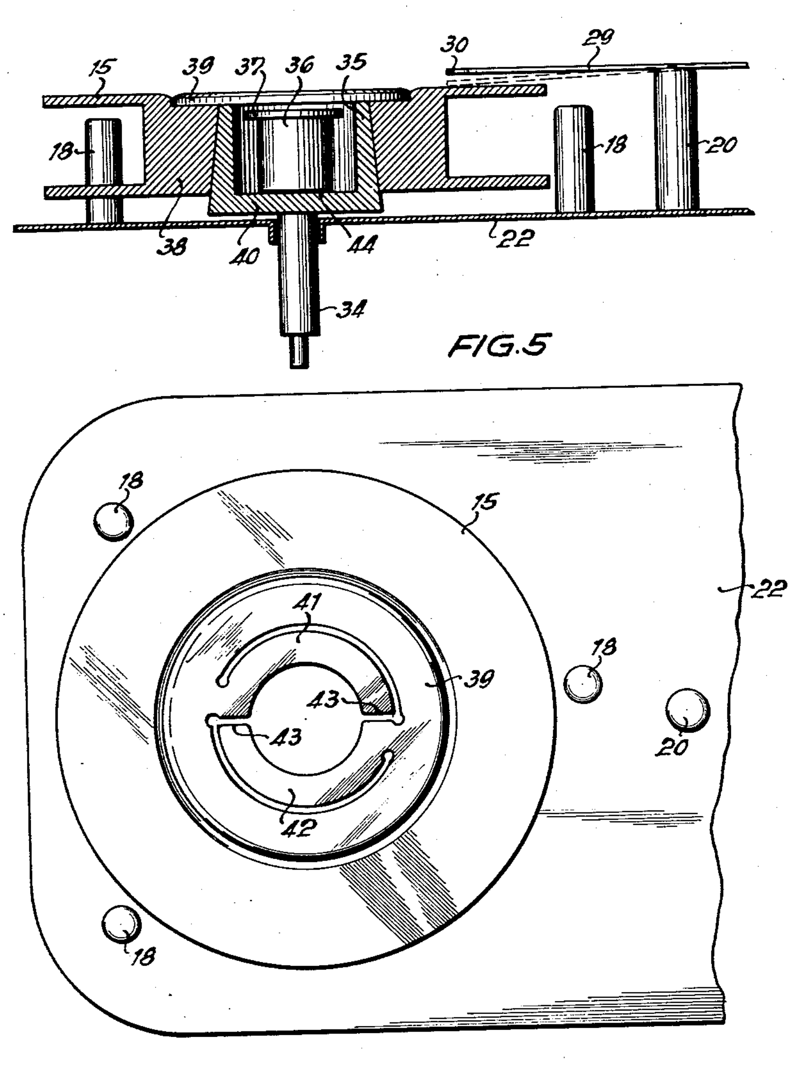
FIG. 4 is an enlarged vertical section along the line A—A of FIG. 1 through the bottom shell of the cassette with one spool and the drive platen.
FIG. 5 is an enlarged view from above on the spool coupling according to FIG. 1.

FIGS. 4 and 5 show an enlarged portion of the platen with a mechanical-magnetic coupling of the spools. At its top, where the coupling with the spool 15 occurs, the drive axis 34 is constructed to be a sort of bowl magnet consisting of a highly magnetic bowl wall 35 of U-shaped cross section and a highly magnetic core 36 furnished at its top end with a pole shoe 37. In downward direction the wall 35 of the bowl magnet widens conically. The seating of the hub 38 of the spool 15 tapers correspondingly to match with and fit on the wall 35, so that the spool centers itself on the wall 35 of the bowl and, therewith, on the drive axis 34.

On the top rim of the spool a soft-magnetic sheet metal plate 39 is inserted to such depth that on close fitting of the hub 38 on the bowl wall 35 it will leave a small gap between itself and the central magnet core 36 with its pole shoe 37, while it is in direct contact with the upper edge of the bowl wall 35. Thus the magnetic flux from the upper edge of the bowl wall 35 through the sheet metal disc 39 to the pole shoe 37, the central magnet core 36 and therefrom again to the bowl bottom 40 is closed. The magnetic seating can be further improved by bundling the magnetic flux. To that end, as shown in FIG. 5, resilient tongues 41 and 42 are cut into the sheet metal disc peripherically to the central magnet core 36. These resilient tongues will be attracted by the central magnet core 36 bending their tips 42 and 43 toward the pole shoe 37, thereby bundling the magnetic flux.

The central magnet core 36 may be made to be an integral part of the bowl 35, 40. Of course, it will be simpler to make the bowl 35, 40 from one piece, and the magnetic core 36 with the pole shoe 37 from a second piece. In that case the magnet core 36 will be affixed to the bowl bottom 40 by means of a thin layer of a suitable binder 44.

On the top side of the upper shell 11 of the cassette an outward or inward bead 45 may be provided to be furnished with an exchangeable note strip 46 on which the recording duration, scaled to the wire length, can be written, thus making it possible at any time, and quickly to find the desired passages of recording from a loaded cassette.

I claim as my invention:

1. In a spool arrangement, in combination, a rotatable substantially cup-shaped supporting member having a bottom wall and an outer peripheral surface tapering in axial direction thereof away from said bottom wall and consisting of magnetic material; a core member arranged in said cup-shaped supporting member, also made of magnetic material and projecting from said bottom wall and spaced from the peripheral wall of said cup-shaped supporting member substantially up to the open end of said cup-shaped supporting member so that said core member and said peripheral wall of said cup-shaped member form the poles of a magnetic system; a reel having a receiving opening in the center thereof corresponding to the peripheral surface of said cup-shaped supporting member so as to fit thereon; and a holding member of magnetizable material superimposed on the end face of said reel located over said receiving opening therein adjacent to said peripheral wall of said cup-shaped supporting member and said core so that the magnetic flux between the poles is closed through said holding member, whereby when said reel is placed on said supporting member, said reel will be held thereon for rotation therewith substantially without slip.

2. In a spool arrangement, in combination, a rotatable substantially cup-shaped supporting member having a bottom wall and an outer peripheral surface tapering in axial direction thereof away from said bottom wall and consisting of magnetic material; a core member arranged in said cup-shaped supporting member, also made of magnetic material and projecting from said bottom wall and spaced from the peripheral wall of said cup-shaped supporting member substantially up to the open end of said cup-shaped supporting member so that said core member and said peripheral wall of said cup-shaped member form the poles of a magnetic system; a reel having a receiving opening in the center thereof corresponding to the peripheral surface of said cup-shaped supporting member so as to fit thereon; and a circular disc of magnetizable material superimposed on and fastened to the end face of said reel located over said receiving opening therein adjacent to said peripheral wall of said cup-shaped supporting member and said core so that the magnetic flux between the poles is closed through said disc, whereby when said reel is placed on said supporting member, said reel will be held thereon for rotation therewith substantially without slip.

3. In a spool arrangement, in combination, a rotatable substantially cup-shaped supporting member having a bottom wall and an outer peripheral frusto-conical surface tapering in axial direction thereof away from said bottom wall and consisting of magnetic material; a core member arranged in said cup-shaped supporting member, also made of magnetic material and projecting from said bottom wall and spaced from the peripheral wall of said cup-shaped supporting member substantially up to the open end of said cup-shaped supporting member so that said core member and said peripheral wall of said cup-shaped member form the poles of a magnetic system; a reel having a frusto-conical receiving opening in the center thereof corresponding to the peripheral surface of said cup-shaped supporting member so as to fit thereon; and a holding member of magnetizable material superimposed on the end face of said reel located over said receiving opening therein adjacent to said peripheral wall of said cup-shaped supporting member and said core so that the magnetic flux between the poles is closed through said holding member, whereby when said reel is placed on said supporting member, said reel will be held thereon for rotation therewith substantially without slip regardless in which relative angular position said reel is placed on said supporting member.

4. In a spool arrangement, in combination, a rotatable substantially cup-shaped supporting member having a bottom wall and an outer peripheral frusto-conical surface tapering in axial direction thereof away from said bottom wall and consisting of magnetic material; a core member centrally arranged in said cup-shaped supporting member, also made of magnetic material and projecting from said bottom wall substantially up to the open end of said cup-shaped supporting member so that said core member and said peripheral wall of said cup-shaped member form the poles of a magnetic system; a reel having a frusto-conical receiving opening in the center thereof corresponding to the peripheral surface of said cup-shaped supporting member so as to fit thereon; and a holding disc of magnetizable material superimposed on the end face of said reel located over said receiving opening therein adjacent to said peripheral wall of said cup-shaped supporting member and said core, said disc being slotted in such a manner as to form resilient tongues capable of being attracted by and physically contacting the poles of said magnetic system so that the magnetic flux between the poles is closed through said tongues, whereby when said reel is placed on said supporting member, said reel will be held thereon for rotation therewith regardless in which relative angular position said reel is placed on said supporting member.

References Cited in the file of this patent

UNITED STATES PATENTS

| | | |
|---|---|---|
| 2,437,997 | Charlin | Mar. 16, 1948 |
| 2,484,552 | Camras | Oct. 11, 1949 |
| 2,490,053 | Harm | Dec. 6, 1949 |
| 2,499,895 | Walker | Mar. 7, 1950 |
| 2,527,391 | Blais | Oct. 24, 1950 |
| 2,535,478 | Arndt | Dec. 26, 1950 |

FOREIGN PATENTS

| | | |
|---|---|---|
| 236,237 | Great Britain | Oct. 29, 1925 |
| 236,574 | Great Britain | July 8, 1926 |
| 633,160 | Germany | Nov. 26, 1931 |
| 864,753 | Germany | Jan. 26, 1953 |